Patented Aug. 30, 1927.

1,640,818

UNITED STATES PATENT OFFICE.

CHARLES H. CAMPBELL, OF PITTSBURGH, PENNSYLVANIA, ASSIGNOR TO AMERICAN GLUE COMPANY, OF BOSTON, MASSACHUSETTS, A CORPORATION OF MASSACHUSETTS.

PROCESS OF MIXING A SOLUBLE FILLER WITH RUBBER.

No Drawing.   Application filed October 22, 1926.   Serial No. 143,521.

The invention relates to an improved process of mixing a soluble filler with rubber (either natural or reclaimed) for the purpose of making a master batch.

The object of the invention is to obtain a homogeneous mass in which the filler is properly mixed and incorporated with the ruber with little difficulty, in a relatively short time, and by which the resulting "mix" has as little moisture in it as possible.

The process is as follows:—

Ordinary milling rolls are employed and they are preferably operated one faster than the other as is customary in rubber milling operations, a speed ratio of one ond one half to one being a good ratio. The rubber to be filled is first fed to these rolls and manipulated by them until it has been thoroughly softened. In practice, for this softening step the rolls are run at a normal temperature preferably less than 100 degrees F. The softening operation ordinarily takes from 3 to 5 minutes.

After the softening of the rubber, while it is still being manipulated by the rolls, the soluble filler in dry form is applied to the rubber, being thrown into the bight of the rolls. The filler should be finely pulverized, and I prefer to use a filler consisting of albuminous matter and preferably a filler consisting of portein derivatives of the albuminoids obtained by the hydrolytic decomposition of simple proteins of the albuminoid group, keratin, collagen and elastin, substantially as described in my co-pending application filed October 13, 1924, Serial No. 746,883, as I have found that such soluble filler may be used to the best advantage in connection with the present process, although other soluble fillers can also advantageously be used. The filler can be used with the rubber in any desired amount, but I have found that it is perhaps better to use a less relative amount of the filler when it is being mixed with reclaimed rubber. For example, with 40 lbs. of natural rubber I employ 40 lbs. of filler and with 50 lbs. of rubber consisting of 25 lbs. of natural rubber and 25 lbs. of reclaimed rubber, I employ 30 lbs. of filler.

After the filler has been incorporated by the rolls throughout the mass, which usually takes 2 to 3 minutes, the rolls are heated, preferably to a temperature of between 175 and 200 degrees F. In practice, I have found a temperature of 180 degrees F. to be a good working temperature. The rotation of the heated rolls is continued for mixing the filler with the rubber and during this rotation the "mix" is sprayed with water at normal temperature in the form of an exceedingly fine spray amounting to a nebula of moisture. This effect may be obtained by a spraying machine common in the trade capable of throwing a very fine spray. The action of the moisture together with the heat operates to dissolve and melt the filler so that as the mixing operation continues it becomes blended with the rubber and practically homogeneous with it. The mixing operation in the presence of moisture is continued until the mixture or blend has been properly effected, which is determined when the rubber begins to pull and string at the bight of the rolls, this taking from 6 to 8 minutes. After this the spray of water is discontinued and the rotation of the heated rolls continued for driving the moisture out of the "mix." This usually takes from 3 to 4 minutes, after which the mass is removed from the rolls in the usual manner and is ready for use, very little moisure remaining in the mass and no such amount of moisture as will be injurious in future vulcanizing operations.

Having thus fully described my invention, I claim and desire to secure by Letters Patent of the United States:—

1. The process of mixing a soluble filler with rubber comprising intimately mixing the rubber and filler in the presence of heat, and moisture applied to the mass in the form of an exceedingly fine spray until the filler has been dissolved and thoroughly incorporated in the mass and afterward expelling moisture from the mass.

2. The process of mixing a soluble filler with rubber comprising intimately mixing the filler in dry pulverized form with the rubber in the presence of heat, and moisture applied to the mass in the form of an exceedingly fine spray until the filler has been dissolved and thoroughly incorporated in the mass and afterward expelling moisture from the mass.

3. The process of mixing a soluble filler with rubber comprising softening the rubber, adding the filler in dry pulverized form to the rubber and intimately mixing in the presence of heat, and moisture applied to the mass in the form of an exceedingly fine spray until the filler has been dissolved and thoroughly incorporated in the mass and afterward expelling moisture from the mass.

4. The process of mixing a soluble filler with rubber comprising milling the rubber applying the filler in dry pulverized form to the rubber during the milling, thoroughly mixing the mass by continued milling in the presence of heat, and moisture applied to the the mass in the form of an exceedingly fine spray until the filler has been dissolved and thoroughly incorporated in the mass and afterward discontinuing the application of moisture and continuing the milling of the mass in the presence of heat for expelling moisture.

5. The process of mixing a soluble filler with rubber comprising softening the rubber by milling, applying the filler in dry pulverized form to the softened rubber during the milling, thoroughly mixing the mass by continued milling in the presence of heat, and moisture applied to the mass in the form of an exceedingly fine spray until the filler has been dissolved and thoroughly incorporated in the mass and afterward discontinuing the application of moisture and continuing the milling of the mass in the presence of heat for expelling moisture.

CHARLES H. CAMPBELL.